US011317158B2

(12) United States Patent
Ciuca et al.

(10) Patent No.: US 11,317,158 B2
(45) Date of Patent: Apr. 26, 2022

(54) VIDEO PLAYBACK IN AN ONLINE STREAMING ENVIRONMENT

(71) Applicant: NETFLIX, INC., Los Gatos, CA (US)

(72) Inventors: Bogdan Joseph Ciuca, San Jose, CA (US); Tony James Casparro, Los Gatos, CA (US); Corey James Grunewald, Oakland, CA (US); Matthew Jeffrey Jaquish, Saratoga, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/669,150

(22) Filed: Oct. 30, 2019

(65) Prior Publication Data
US 2020/0145726 A1    May 7, 2020

Related U.S. Application Data

(60) Provisional application No. 62/755,326, filed on Nov. 2, 2018.

(51) Int. Cl.
*H04N 21/472*    (2011.01)
*H04N 21/431*    (2011.01)
*H04N 21/435*    (2011.01)
*H04N 21/44*    (2011.01)
(Continued)

(52) U.S. Cl.
CPC ..... *H04N 21/47217* (2013.01); *H04N 21/431* (2013.01); *H04N 21/435* (2013.01); *H04N 21/44* (2013.01); *H04N 21/47202* (2013.01); *H04N 21/4821* (2013.01); *H04N 21/4852* (2013.01)

(58) Field of Classification Search
None
See application file for complete search history.

(56) References Cited

U.S. PATENT DOCUMENTS 9,426,519 B1 *    8/2016    Lewis .................. H04N 21/242
2007/0150930 A1 *    6/2007    Koivisto ............. G06F 16/9562
725/134
2012/0287234 A1    11/2012    Kim
(Continued)

FOREIGN PATENT DOCUMENTS

WO    2009/122239 A1    10/2009

OTHER PUBLICATIONS

International Search Report for application No. PCT/US2019/059527 dated Jan. 8, 2020.

*Primary Examiner* — Jefferey F Harold
*Assistant Examiner* — Charles N Hicks
(74) *Attorney, Agent, or Firm* — Artegis Law Group, LLP

(57) ABSTRACT

A computer-implemented method of displaying video content includes, based on an input to transition playback of a video content item from a first media player that is instantiated in a user interface to a second media player that is instantiated in the user interface, determining a current value of a first state descriptor associated with the first media player; setting a value of a second state descriptor associated with the second media player to match the current value of the first state descriptor; and after setting the value of the second state descriptor, causing the second media player to begin playback of the video content item, wherein the second media player begins playing the video content item based on the value of the second state descriptor.

19 Claims, 16 Drawing Sheets

(51) Int. Cl.
*H04N 21/485* (2011.01)
*H04N 21/482* (2011.01)

(56) References Cited

U.S. PATENT DOCUMENTS

| | | | |
|---|---|---|---|
| 2014/0096166 A1* | 4/2014 | Gordon | H04N 21/442 |
| | | | 725/86 |
| 2014/0129716 A1* | 5/2014 | Garza | G06F 16/00 |
| | | | 709/226 |
| 2016/0212487 A1* | 7/2016 | Rao | H04N 21/47205 |
| 2017/0180780 A1* | 6/2017 | Jeffries | H04N 21/4307 |
| 2018/0098017 A1 | 4/2018 | Vaysman et al. | |
| 2019/0349380 A1* | 11/2019 | Thomas | H04L 63/062 |
| 2020/0120159 A1* | 4/2020 | Momchilov | H04L 67/141 |

\* cited by examiner

VIDEO PLAYBACK IN AN ONLINE STREAMING ENVIRONMENT

CROSS-REFERENCE TO RELATED APPLICATION

This application claims priority benefit of the U.S. Provisional Patent Application titled, "CONTENT PREVIEW INTERFACE," filed on Nov. 2, 2018 and having Ser. No. 62/755,326. The subject matter of this related application is hereby incorporated herein by reference.

BACKGROUND

Field of the Various Embodiments

The present disclosure relates generally to playing streaming video and, more specifically, to video playback in an online streaming environment.

Description of the Related Art

With on-demand video streaming becoming one of the most popular forms of media consumption, the number of titles available to the on-demand viewer has been increased dramatically. However, despite the wide variety of titles now available, on-demand viewers frequently have difficulty locating content that they find interesting. For example, by simply scanning a list of a possible video titles to view, the on-demand viewer is unlikely to make a satisfactory selection; even if the list of titles is sorted by genre, selection of a particular title in this way is little more than a random process unless the subject matter of that particular title is already known to the on-demand viewer. Similarly, reading a plot summary for each title option being considered is an ineffective way for the on-demand viewer to locate content of interest; searching for a suitable video title in this way is very time-consuming and generally requires the user to put significant effort into researching each and every title that sounds at all interesting.

In light of the above, video streaming services currently facilitate the selection process for a prospective on-demand viewer by presenting to the viewer a static representative image for each available title. Each static image serves the same function for the associated title as the cover art of a book, video tape, or digital versatile disk (DVD), promoting the title while visually providing some insight into the subject matter of the title. For example, a static image can quickly convey one or more of the genre, subject matter, starring actors, or other attributes of a title. Additional textual information, such as a summary sentence or a tag line, may also be included in the static image. Generally, a plurality of such static images is presented in an array, so that the on-demand viewer can visually browse through a large number of possible video titles quickly.

One drawback of relying on an array of such images for enabling video selection is that a static, box-art-like image cannot convey much detailed information about a particular video title. As a result, a prospective viewer is less likely to be drawn in by such a selection process and select a video title. By contrast, trailer and other summary videos are well-known to give significant insight into the subject matter of a video title in a short time. Consequently, summary videos are more likely to successfully gain the interest of the prospective viewer and influence the viewer to select the video title associated with the trailer. However, summary videos are data-intensive, and downloading of such videos can overload or slow the streaming connection employed by the prospective viewer. In addition, the various user interactions that are enabled by streaming video to a computer can further complicate the streaming process. For example, requesting preview videos for multiple available titles can overload the download process and impact other processes running in parallel on the computer.

As the foregoing illustrates, what is needed in the art are systems and methods for more effectively displaying video previews.

SUMMARY

A method of displaying video content includes, based on an input to transition playback of a video content item from a first media player that is instantiated in a user interface to a second media player that is instantiated in the user interface, determining a current value of a first state descriptor associated with the first media player; setting a value of a second state descriptor associated with the second media player to match the current value of the first state descriptor; and after setting the value of the second state descriptor, causing the second media player to begin playback of the video content item, wherein the second media player begins playing the video content item based on the value of the second state descriptor.

At least one technological improvement of the disclosed embodiments is that coordination of video playback is enabled between multiple UI components that can each perform video playback simultaneously. Consequently, downloading multiple video data streams when transitioning video playback from one UI component to another UI component can be avoided. In addition, multiple UI components are prevented from simultaneously performing playback of video content.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
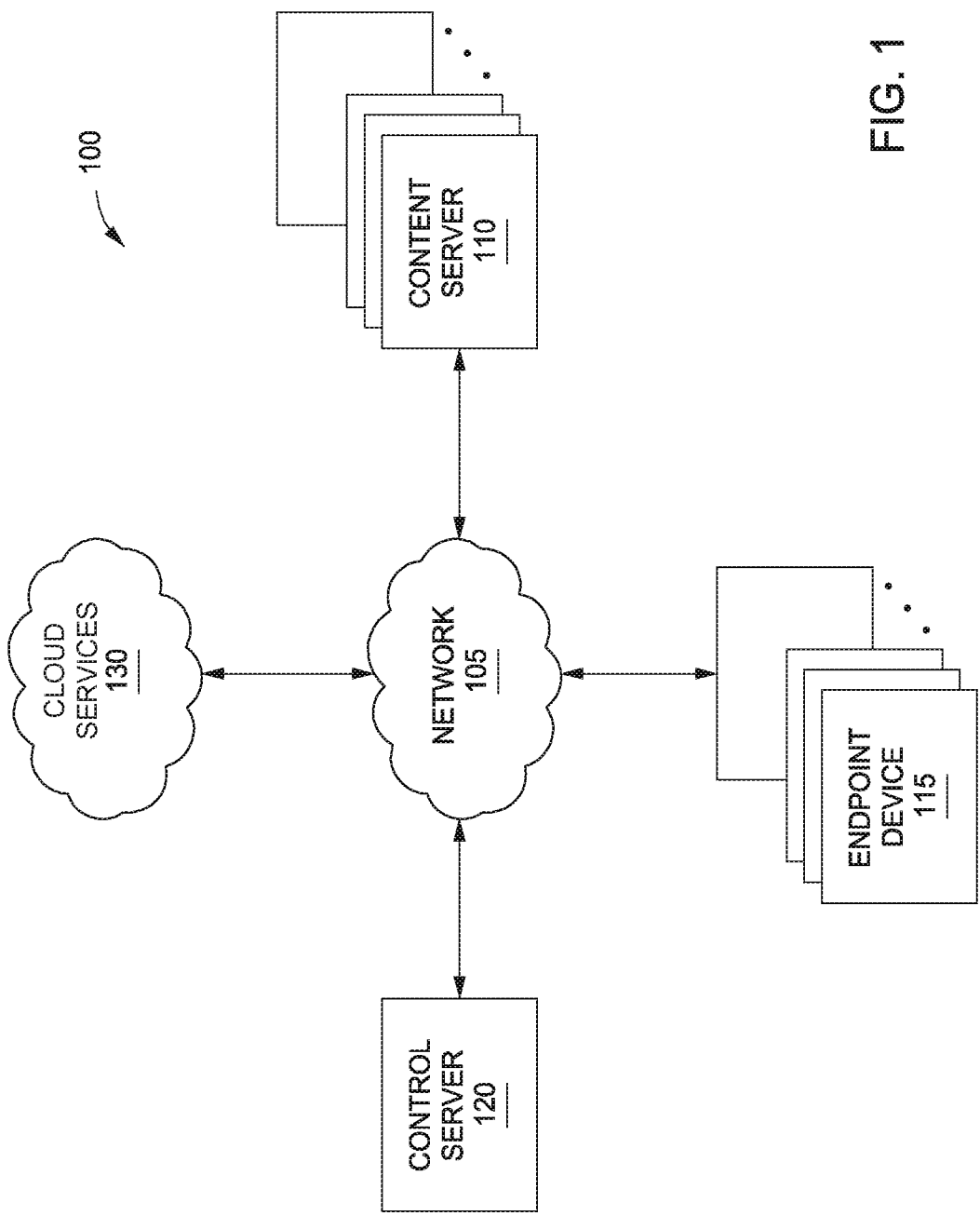
FIG. 1 illustrates a network infrastructure, according to various embodiments.

In the following description, numerous specific details are set forth to provide a more thorough understanding of the various embodiments. However, it will be apparent to one of skilled in the art that the inventive concepts may be practiced without one or more of these specific details.

Overview

Trailer videos and other summary videos give insight into the subject matter of a video title in a short time. Thus, summary videos are more likely to successfully gain the interest of the prospective viewer and influence the viewer to select the video title associated with the trailer. However, summary videos are data-intensive, and downloading of such videos can overload or slow the streaming connection employed by the prospective viewer. Further, the media players integrated into a user interface for streaming videos generally operate independently from each other, where each media player is unaware of the playback state of other media players associated with the user interface. Consequently, coordination between such media players can be problematic; a user requesting a video preview for multiple video titles can result in multiple videos being played concurrently. In addition, when playback of a preview video transitions from a first media player to a second media player (for example, from a lower resolution media player to a higher resolution media player), the second media player begins playing the preview video from the beginning, which can be frustrating to the user. The disclosed techniques enable a smooth transition between the playback of a preview video in one media player implemented in a streaming video user interface and another media player implemented in the user interface. As a result, a user is more likely to be drawn in by such a selection process and select a video title.

In various embodiments, playback state descriptors are employed to track certain attributes of each user interface (UI) component (such as a media player) instantiated in a user interface. These attributes include the current play time of a video being played by the UI component, a sound volume level for a video being played by the UI component, a mute state of the UI component, and the like. The current values of such playback state descriptors for multiple UI components are stored in a client-side database. When transitioning playback of video content from a first UI component (such as a first media player) to a second UI component (such as a second media player), a user interface engine determines a current value of a playback state descriptor of the first UI component from the database. The user interface engine then sets the corresponding playback state descriptor of the second UI component to match the current value of the playback state descriptor of the first UI component and begins playback of the video content with the second UI using the current value of the playback state descriptor of the first UI component. As a result, the second UI component begins playback of the video content in a playback state that is the same as the playback state of the first UI component when playback of the video content is transitioned from the first UI component. For example, in one embodiment, the second UI component begins playback of the video content at the point in time at which the first UI stopped playback of the video content. In another embodiment, the second UI component begins playback of the video content at the same sound level employed by the first UI component when performing playback of the video content.

Advantageously, coordination of video playback is enabled between multiple UI components that can each perform video playback simultaneously. Consequently, multiple UI components are prevented from simultaneously performing playback of video content. Further, with only a single video being played back at a given time, downloading multiple video data streams is avoided when transitioning video playback from one UI component to another UI component.

System Configuration

FIG. 1 illustrates a network infrastructure 100, according to various embodiments. As shown, the network infrastructure 100 includes content servers 110, control server 120, and endpoint devices 115, each of which are connected via a communications network 105. Network infrastructure 100 is configured to distribute content to content servers 110, and such content is then distributed on-demand to endpoint devices 115.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 (described below) configured to communicate with the control server 120 to determine the location and availability of various files that are managed by the control server 120. Each content server 110 may further communicate with cloud services 130 and one or more other content servers 110 in order to "fill" each content server 110 with copies of various files. In addition, content servers 110 may respond to requests for files received from endpoint devices 115. The files may be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110.

Cloud services 130 also may provide compute or other processing services. Although only a single cloud services 130 is shown in FIG. 1, in various embodiments multiple cloud services 130 may be implemented.

Figure 2:
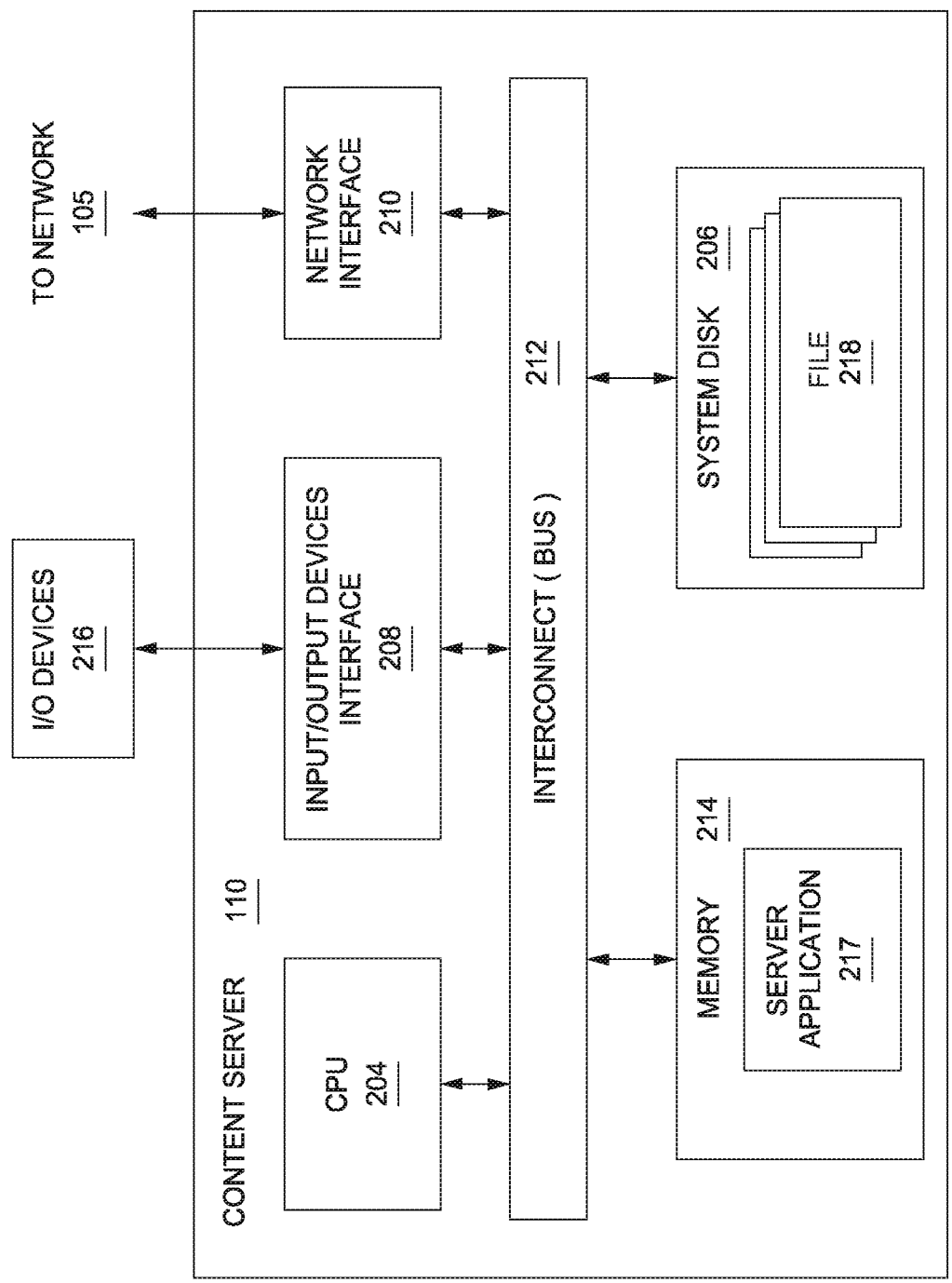
FIG. 2 is a more detailed illustration of the content server of FIG. 1, according to various embodiments.

FIG. 2 is a more detailed illustration of content server 110 of FIG. 1, according to various embodiments. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include textual content associated with such digital visual content items, such as movie metadata. In some embodiments, a plurality of files 218 may be associated with a single video title. For example, in one such embodiment, for a specific video title that is available via content server 110 (such as a movie), there are multiple video streaming files associated with that specific video title, where each file is for a different resolution of the specific video title. Further, in such embodiments, the multiple video streaming files can further include multiple preview video files that are each configured for a different resolution of a preview video for the specific video title.

Figure 3:
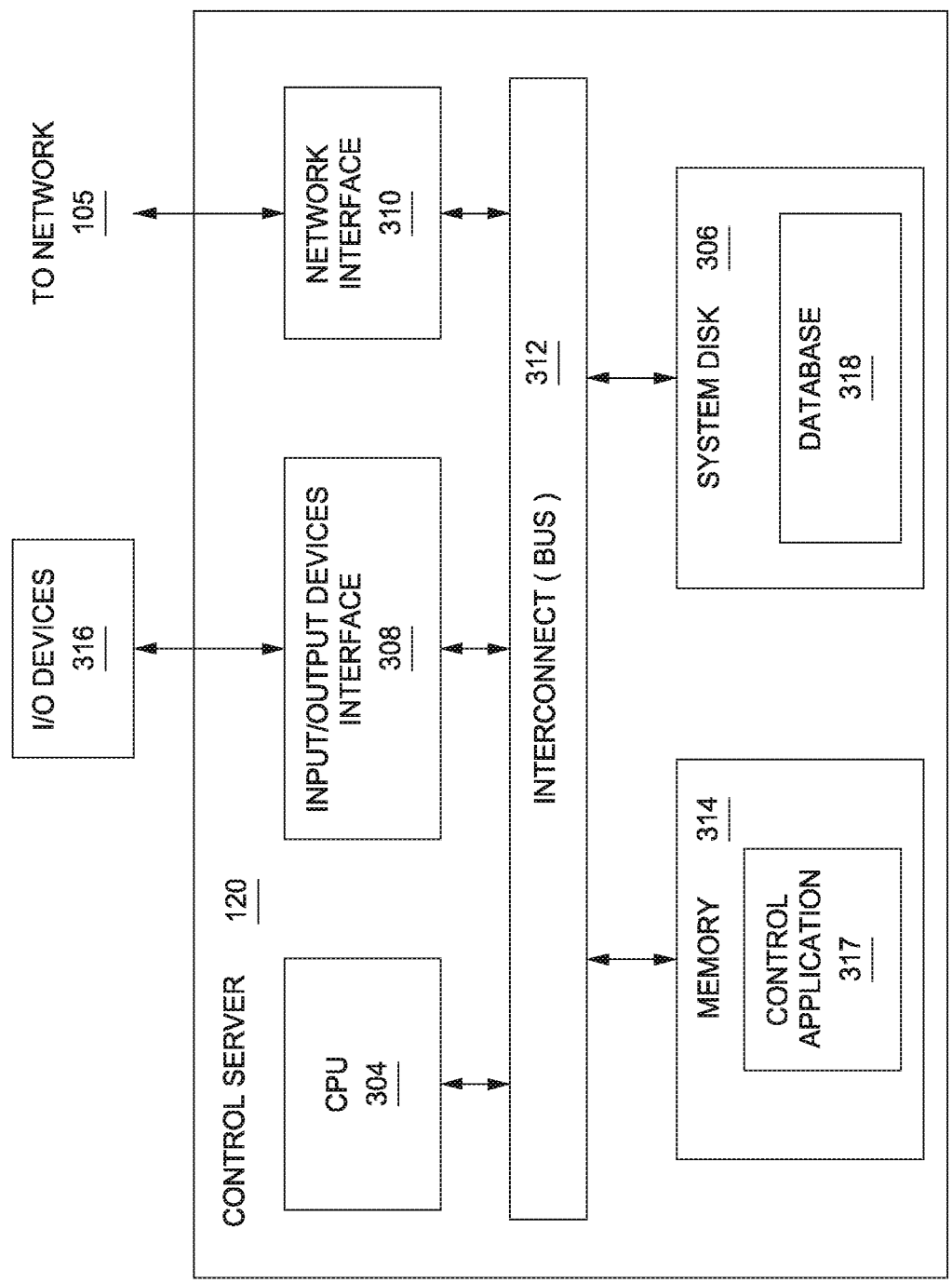
FIG. 3 is a more detailed illustration of the control server of FIG. 1, according to various embodiments.

FIG. 3 is a more detailed illustration of control server 120 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 (shown in FIG. 2) is configured to store a database 318 of information associated with content servers 110, cloud services 130, and files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115.

Figure 4:
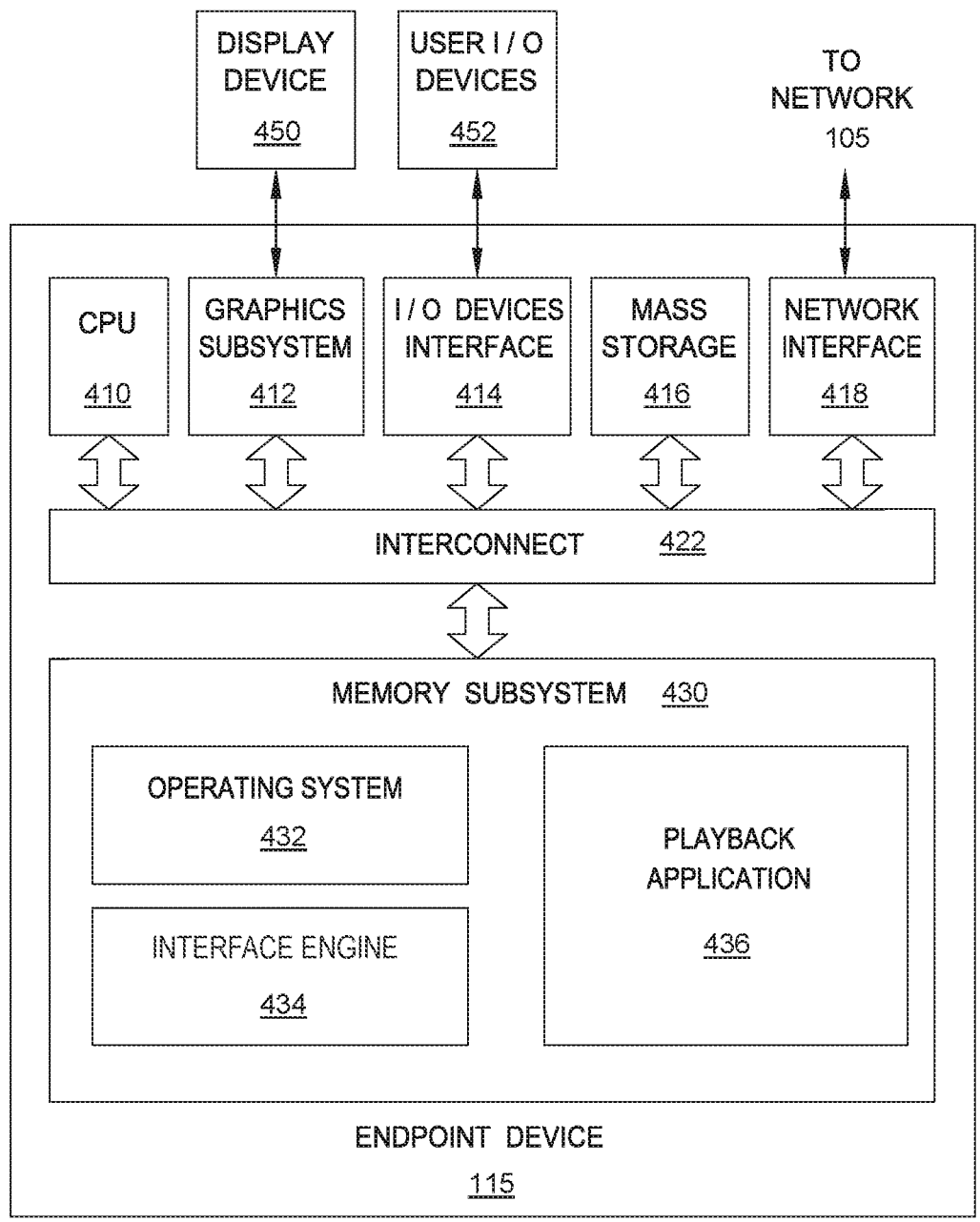
FIG. 4 is a more detailed illustration of the endpoint device of FIG. 1, according to various embodiments.

FIG. 4 is a more detailed illustration of the endpoint device 115 of FIG. 1, according to various embodiments. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 is also configured to generate a graphical user interface (GUI) and transmit the GUI to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray tube technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one or more buttons or other pointing devices, such as the "up," "down," "left," "right," and "select" buttons on a television remote or video game console. The I/O device interface 414 also includes an audio output unit configured to generate an electrical audio output signal. User I/O devices 452 includes an audio speaker configured to generate an acoustic output in response to the electrical audio input signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, an interface engine 434, and a playback application 436. The operating system 432 performs system management functions such as managing hardware devices including the network interface 418, mass storage unit 416, I/O device interface 414, and graphics subsystem 412. The operating system 432 also provides process and memory management models for the interface engine 434 and the playback application 436. The interface engine 434, such as a window and object metaphor, provides a mechanism for user interaction with endpoint device 115, such as a graphical user interface (GUI). Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

User Interface with Embedded Video Players

Figure 5:
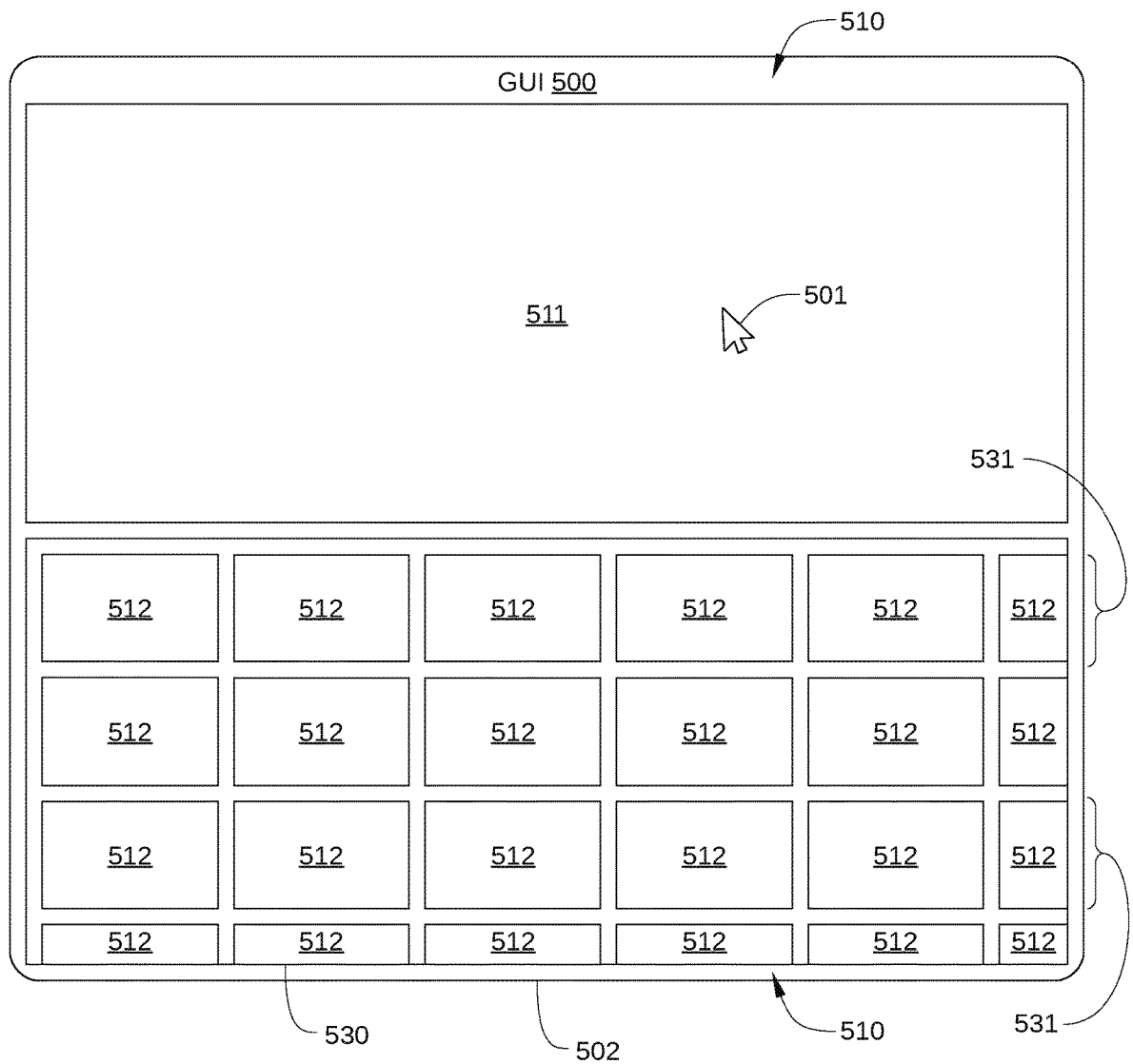
FIG. 5 illustrates a graphical user interface (GUI) generated by the interface engine of FIG. 4, according to various embodiments.

FIG. 5 illustrates a graphical user interface (GUI) 500 generated by interface engine 434 of FIG. 4, according to various embodiments. GUI 500 can be displayed on display device 450 of endpoint device 115, particularly when endpoint device 115 is configured as a laptop computer, desktop computer, or other computing system. As shown, GUI 500 includes various display canvases 510 that are each configured to display information pertaining to a specific video content item, such as a particular video title. In some embodiments, each display canvas 510 includes an instance of a media player. Thus, each display canvas 510 is a fixed or moveable display region that can display a still image or a preview video for a specific video content item. Examples of video content items include movies, television series, documentaries, specific sporting events, and the like.

Display canvases 510 can include different configurations of display region. For example, display canvases 510 include a single large-presentation canvas, referred to herein as a "billboard canvas" 511, and a plurality of array-sized canvases, referred to herein as "title card canvases" 512, or a combination thereof. In various embodiments, billboard canvas 511 is larger than title card canvases 512 and is configured to automatically begin playing a preview video for a predetermined video content item, such as a newly released or otherwise featured video content item. In some embodiments, billboard canvas 511 is sized and positioned more prominently than any of title card canvases 512 to attract the attention of an on-demand user. For example, in some embodiments, billboard canvas 511 is initially or permanently positioned in a top region of GUI 500. Additionally or alternatively, in some embodiments, a billboard canvas 511 can be disposed between arrays of title card canvases 512. In such embodiments, as a user scrolls downward within GUI 500, at least one billboard canvas 511 is visible to the on-demand user. By contrast, title card canvases 512 are typically displayed in an array 530 and are generally configured to enable the on-demand user to visually scan the title card canvases 512 of a large number of available video content items. For example, in the embodiment illustrated in FIG. 5, title card canvases 512 are arranged in multiple rows 531, where each row 531 includes title card canvases 512 of a specific genre or category.

In addition to display canvases 510, GUI 500 displays a cursor 501 and, in some embodiments, additional navigation tools, such as a side-bar menu and/or drop-down menus (not shown). In some embodiments, moving cursor 501 to an edge of GUI 500 causes scrolling of the contents of GUI 500 in an appropriate direction. For example, in such embodiments, positioning cursor 501 at or near a bottom edge 502 of GUI 500 can cause display canvases 510 to move upward, revealing additional display canvases 510.

Figure 6A:
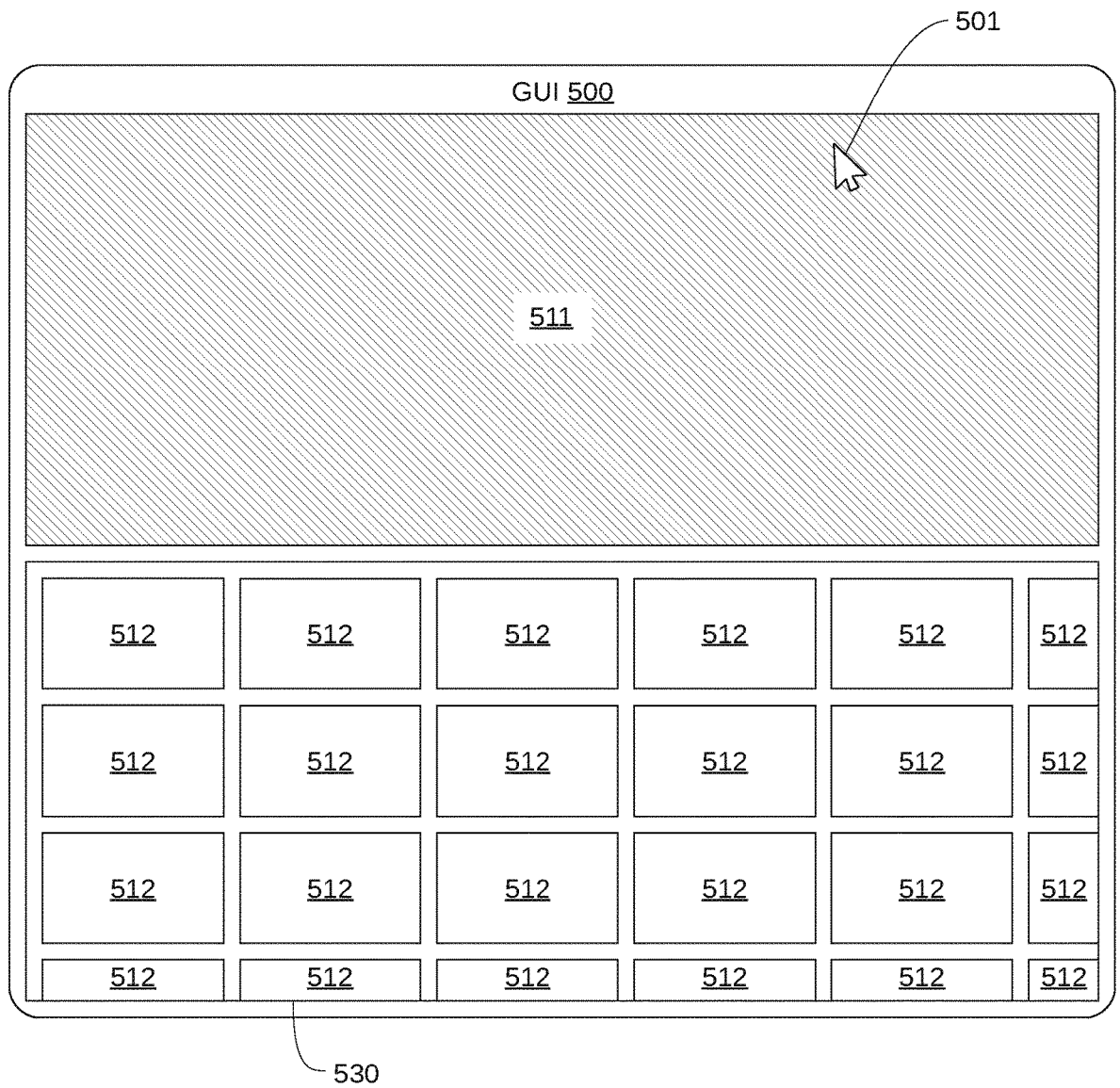
FIGS. 6A-6G illustrate the GUI of FIG. 5 at various points in a process of displaying preview videos of available content items, according to various embodiments.

FIGS. 6A-6G illustrate GUI 500 at various points in a process of displaying preview videos of available content items, according to various embodiments. In FIG. 6A, an on-demand user has started playback application 436 and GUI 500 is displayed to an on-demand user. In the embodiment illustrated in FIGS. 6A-6G, upon start-up of playback application 435, cursor 501 is displayed in a neutral position, i.e., cursor 501 is not positioned within the boundaries of any of title card canvases 512. As a result of GUI 500 being started up, a preview video for a featured video content item begins playing in billboard canvas 511. Because cursor 501 is in a neutral position, no other display actions are implemented in GUI 500 and title card canvases 512 each display a static image associated with a different video content item that is currently available for selection.

Figure 6B:
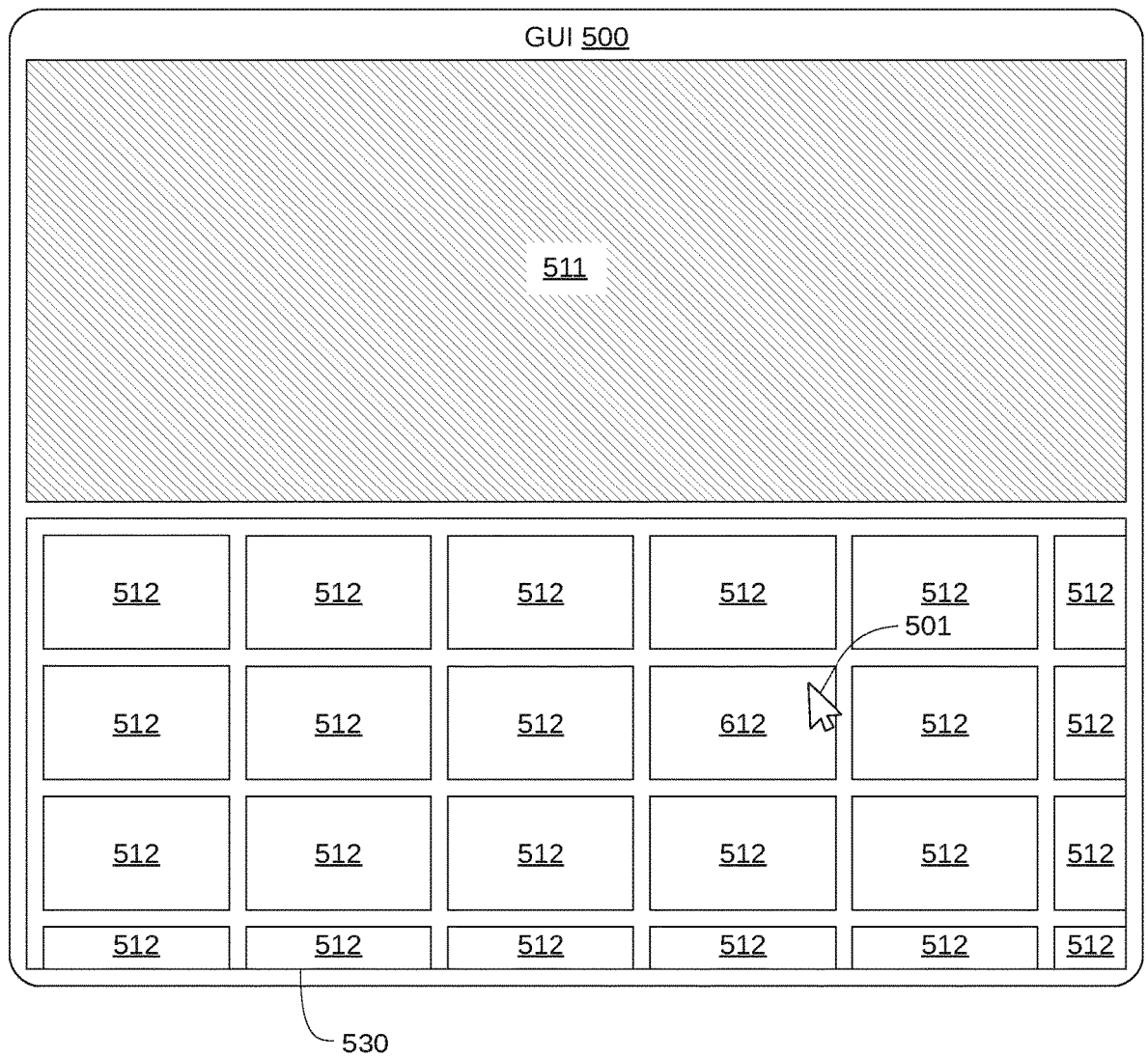

In FIG. 6B, the on-demand user has moved cursor 501 to a particular title card canvas 612 and hovers cursor 501 over title card canvas 612. Title card canvas 612 is a specific title card canvas associated with a video content item of interest to the on-demand user. As shown, until cursor 501 has hovered over title card canvas 612 for a predetermined hover time interval (e.g., 1 second), the preview video for the featured video content item continues playing in billboard canvas 511 and a static image (not shown) associated with the video content item of interest continues to be displayed in title card canvas 612.

Figure 6C:
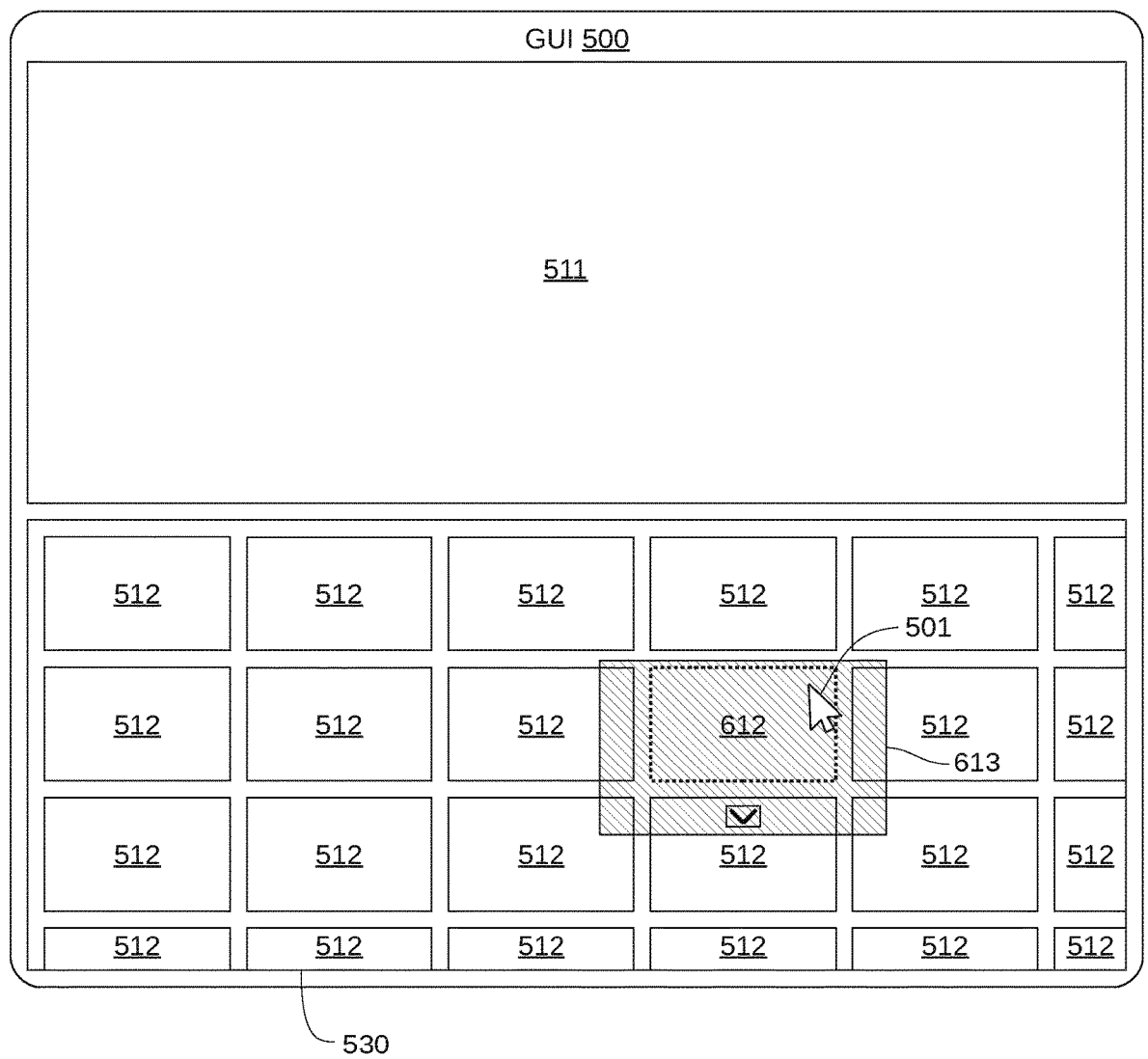

In FIG. 6C, the on-demand user has hovered cursor 501 over title card canvas 612 for the predetermined hover time interval. In response, title card canvas 612 appears to expand to larger video preview canvas 613, which then begins playback of a preview video for the video content item of interest. For example, in some embodiments, a series of animated images are displayed at or in lieu of title card canvas 612, causing the still image displayed by title card canvas 612 to appear to expand in size to the dimensions of video preview canvas 613.

Simultaneously, or at approximately the same time, billboard canvas 511 halts or pauses playback of the preview video for the featured video content item. When billboard canvas 511 pauses playback of the preview video for the featured video content item, billboard canvas 511 displays a still image that includes the last frame of the preview video for the featured video content item. When billboard canvas 511 halts playback of the preview video, billboard canvas 511 displays a predetermined still image associated with the featured video content item. In either case, in FIG. 6C, billboard canvas 511 is no longer performing playback of the preview video for the featured video content item. Therefore, according to the embodiment illustrated in FIGS. 6A-6G, even though billboard canvas 511 is configured to automatically play a preview video without user input, when a user input indicates a request for a different canvas to playback a preview video (e.g., by hovering cursor 501 over title card canvas 612), the instance of media player included in billboard canvas 511 halts or pauses playback. Thus, playback of a single video takes place at one time in GUI 500, and the on-demand viewer is not confused or distracted by having multiple preview videos playing simultaneously. Further, the necessity for multiple streaming videos to be downloaded simultaneously to endpoint device 115 is avoided.

In alternative embodiments, in response to the on-demand user hovering cursor 501 over title card canvas 612, title card canvas 612 does not appear to expand to larger video preview canvas 613. Instead, in such embodiments, video preview canvas 613 has the same dimensions as title card canvas 612, and begins playback of the preview video for the video content item of interest in the same portion of GUI 500 previously occupied by title card canvas 612. Therefore, in such embodiments, video preview canvas 613 is instantiated in substantially the same location as title card canvas 612. In yet other alternative embodiments, in response to the on-demand user hovering cursor 501 over title card canvas 612, an instance of a media player already included in or associated with title card canvas 612 begins playback of the preview video for the video content item of interest.

Figure 6D:
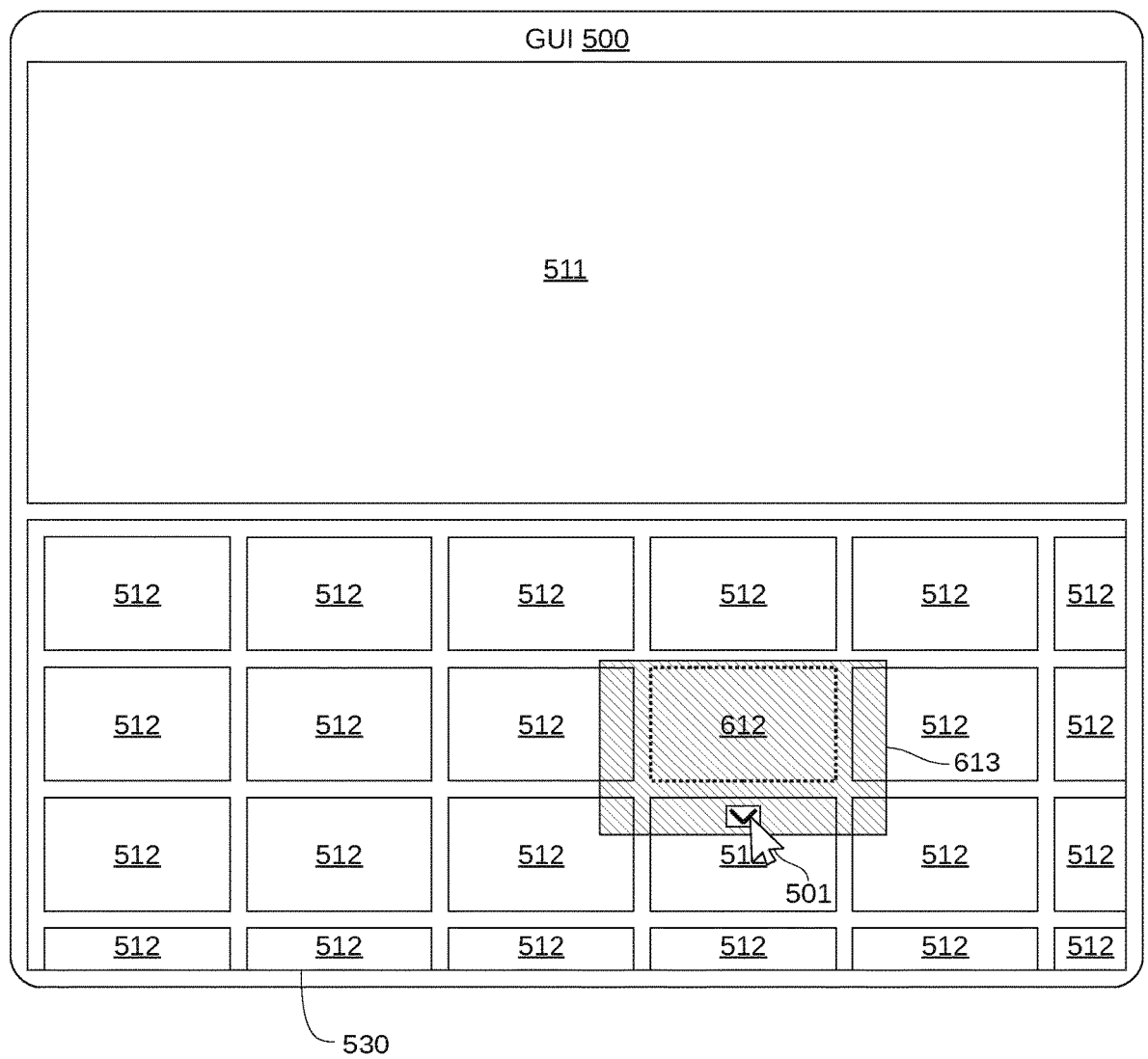

In FIG. 6D, the on-demand user has performed an input operation indicating a request for more detailed information regarding the video content item associated with title card canvas 612 or video preview canvas 613. As shown, when the input operation is performed, the preview video for the featured video content item continues playing in video preview canvas 613.

The input operation performed in FIG. 6D can be any suitable input operation compatible with endpoint device 115 and any of the input devices associated therewith. For example, in some embodiments, the input operation is a left click with a computer mouse on a more details icon 601 that is displayed in video preview canvas 613. Alternatively, in some embodiments, the input operation can be one or more of: hovering a portion of cursor 501 over more details icon 601; selection of a more details option from a drop-down menu (not shown), such as a drop-down menu that is displayed in response to a right click with a computer mouse on a portion of video preview canvas 613; depression of a hot key or combination of hot keys on a computer keyboard while cursor 501 hovers over a portion of more details icon 601 and/or video preview canvas 613; and the like. In embodiments in which endpoint device 115 comprises a mobile computing device (such as a smartphone), the input operation can include any input operation compatible with a mobile device interface (such as a screen touch or swipe). In embodiments in which endpoint device 115 comprises a television (such as a smart TV), the input operation can include any input operation compatible with a television interface (such as a TV remote section or input).

Figure 6E:
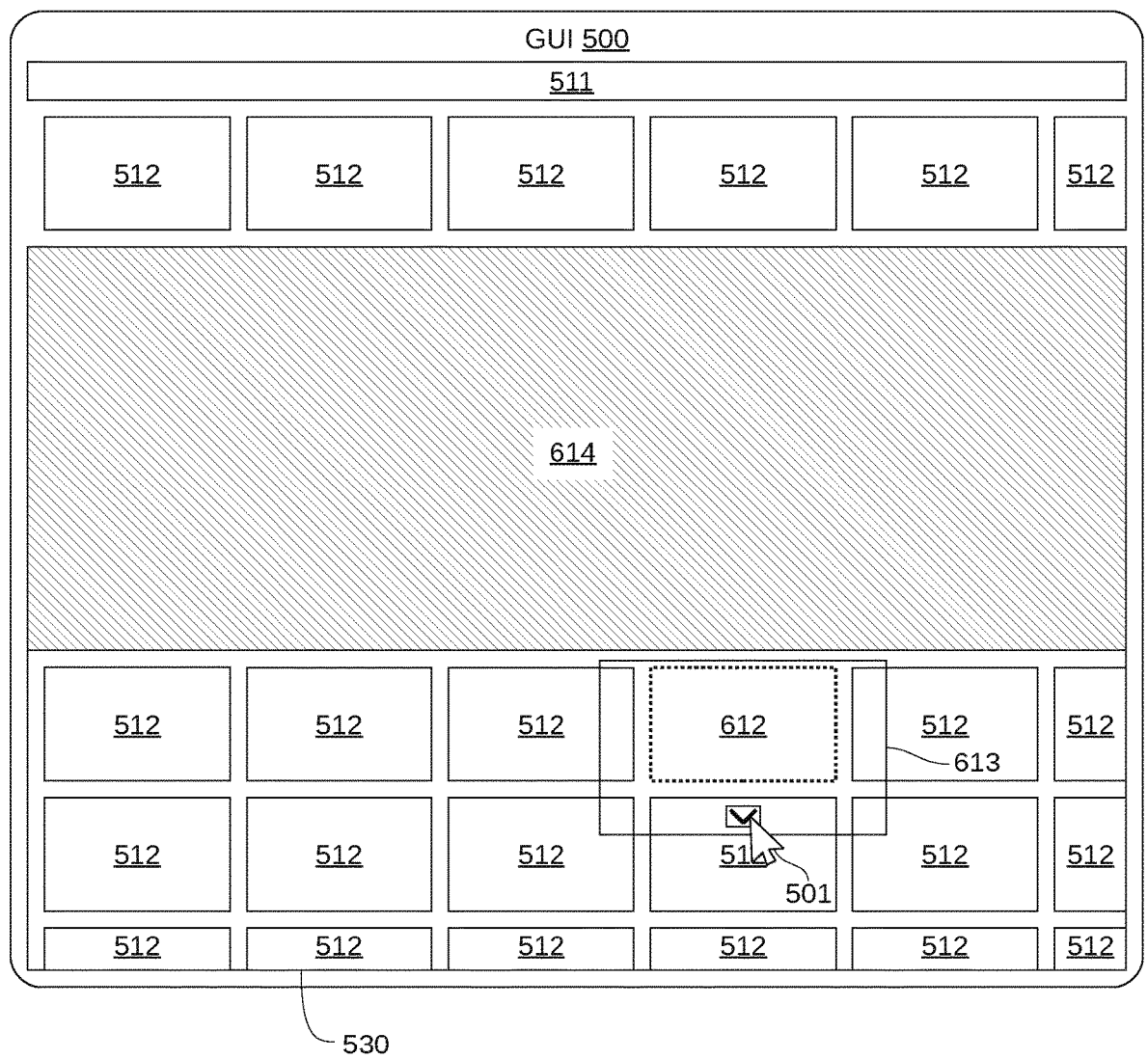

In FIG. 6E, in response to the input operation indicating the request for more detailed information, a feature-sized video preview canvas 614 is implemented in GUI 500 that continues playback of the preview video for the video content item of interest. For example, in some embodiments, feature-sized video preview canvas 614 is configured with similar dimensions, textual content, and/or control icons as billboard canvas 511. Alternatively, in some embodiments, feature-sized video preview canvas 614 replaces, is overlayed on, and/or or otherwise obscures video preview canvas 613.

Simultaneously, or at approximately the same time, video preview canvas 613 halts or pauses playback of the featured video content item. Therefore, according to the embodiment illustrated in FIGS. 6A-6G, even though video preview canvas 613 is configured to playback the preview video for the video content item of interest, video preview canvas 613 halts or pauses playback of the preview video for the video content item in response to the input operation indicating the request for more detailed information. Thus, playback of a single video takes place at one time in GUI 500.

In FIGS. 6C and 6D, a first instance of the preview video for the video content item of interest is played in a first instance of a media player associated with video preview canvas 613, and in FIG. 6E the first instance of the media player halts or pauses the first instance of the preview video in a first playback state. By contrast, in FIG. 6E, a second instance of a media player associated with feature-sized video preview canvas 614 begins playback of a second instance of the preview video for the video content item. According to various embodiments, the second instance of the preview video begins playback in feature-sized video preview canvas 614 in the first playback state. That is, the second instance of the media player associated with feature-sized video preview canvas 614 begins playback of the second instance of the preview video in the same playback state as the first instance of the preview video when the first instance of the preview video is halted or paused in video preview canvas 613.

Figure 6F:
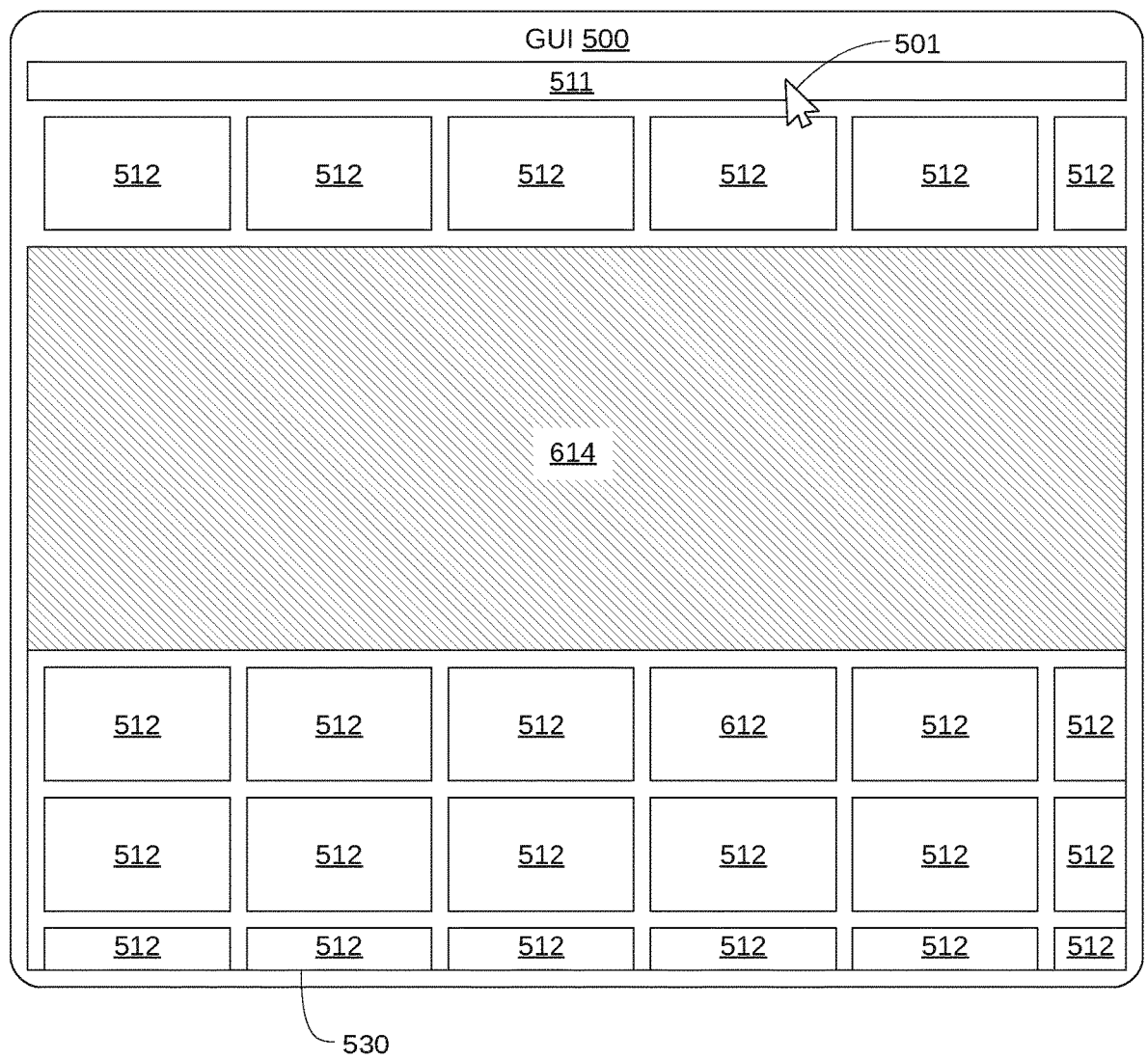

In FIG. 6F, the on-demand user has performed an input operation indicating an interest in the video content item associated with a different display canvas 510 than feature-sized video preview canvas 614. In some embodiments, the input operation performed in FIG. 6F can be any suitable input operation compatible with endpoint device 115 and any of the input devices associated therewith, including hovering cursor 501 over a particular display canvas 510, selecting a particular display canvas 510 with a left click with a computer mouse, and the like. In the embodiment illustrated in FIG. 6F, the on-demand user has hovered at least a portion of cursor 501 over a portion of billboard canvas 511, which has been partially scrolled out of GUI 500. Thus, the on-demand user has indicated an interest in the video content item associated with billboard canvas 511. As shown, when the input operation is performed, the preview video for the video content item associated with feature-sized video preview canvas 614 continues to be played in feature-sized video preview canvas 614.

Figure 6G:
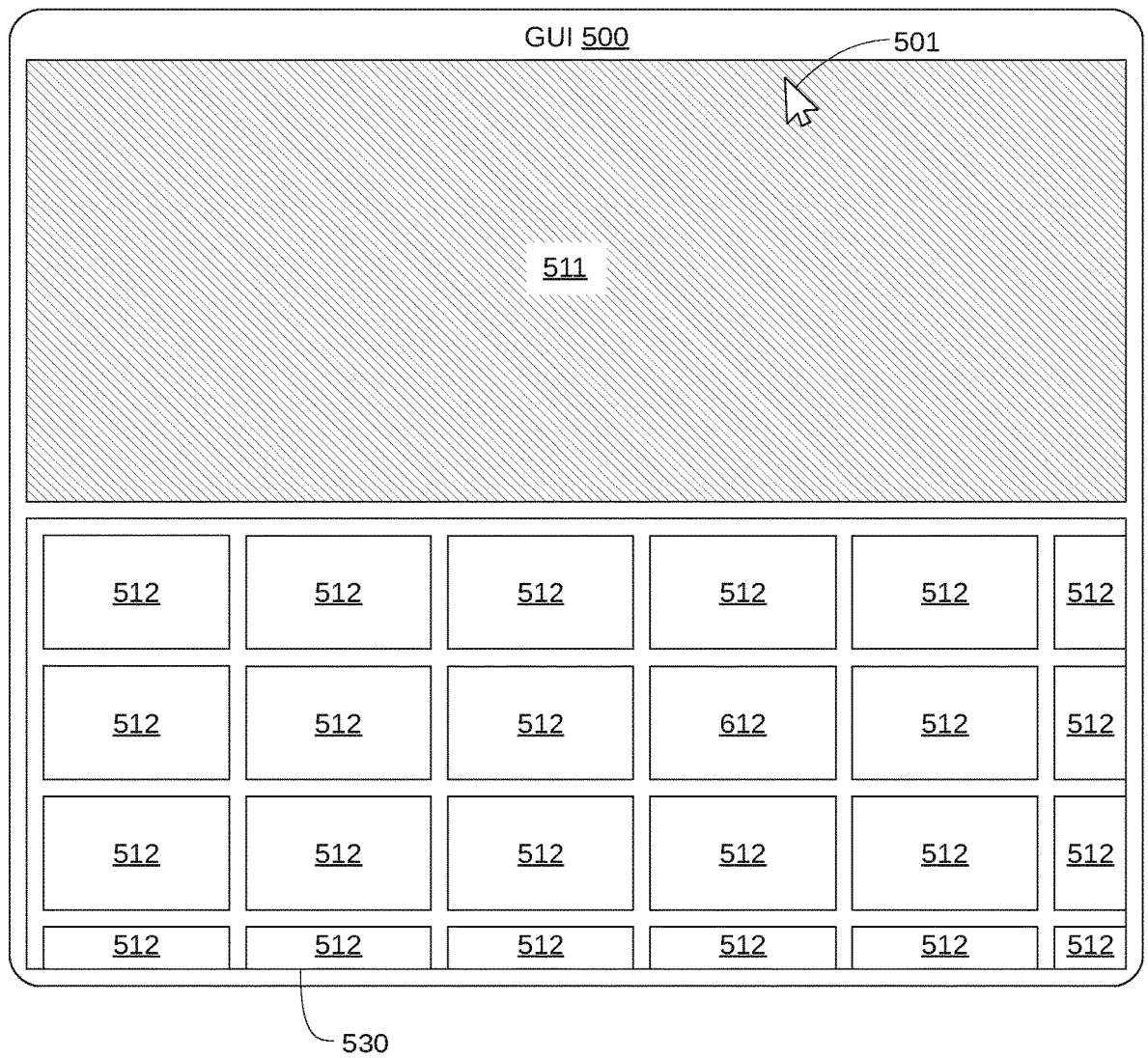

In FIG. 6G, in response to the input operation indicating an interest in the video content item associated with billboard canvas 511, billboard canvas 511 is repositioned within GUI 500. In addition, the preview video for the featured video content item associated with billboard canvas 511 begins playing in billboard canvas 511. For example, in some embodiments, a media player associated with billboard canvas 511 begins playback of the preview video. According to some embodiments, playback of the preview video for the featured video content item begins in the same playback state as the playback state of the preview video when last paused or halted. Consequently, the on-demand user, having already seen a beginning portion of the preview video, is not forced to re-watch the beginning portion of the preview video. In addition, the audio state of the preview video, e.g., mute state or volume level, is the same as the audio state of the preview video most recently played in GUI 500. In FIG. 6G, the preview video most recently played in GUI 500 is the preview video for the video content item that was being played in feature-sized video preview canvas 614.

Simultaneously, or at approximately the same time, feature-sized video preview canvas 614 halts or pauses playback of the featured video content item. Thus, playback of a single video takes place at one time in GUI 500.

Generally, the media players implemented in GUI 500 are instantiated by interface engine 434 and include the media player associated with billboard canvas 511, the media player associated with video preview canvas 613, and the media player associated with feature-sized video preview canvas 614, among others. Further, each such media player generally operates independently from the other media players implemented in GUI 500. Consequently, coordination between such media players as described above can be problematic, since each media player is unaware of the playback state of other media players associated with GUI 500. According to various embodiments, seamless transition is enabled between the playback of a preview video in one media player implemented in GUI 500 and another media player implemented in GUI 500. Specifically, when an on-demand user requests playback of a preview video to transition from a first display canvas 510 to a second display canvas 510, a media player associated with the second display canvas 510 performs playback of the preview video based on the playback state of the media player performing playback of the preview video in the first display canvas. One such embodiment is illustrated in FIG. 7.

Preview Playback Application

Figure 7:
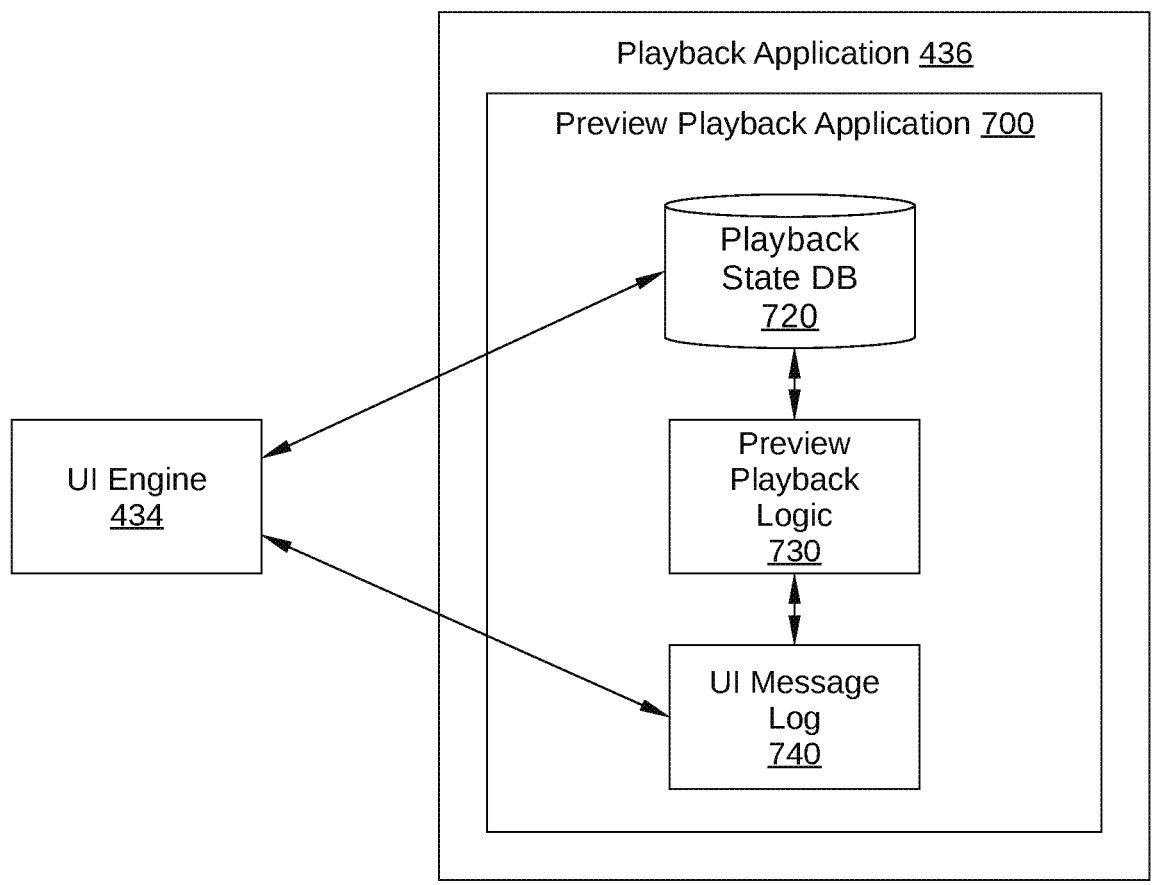
FIG. 7 is a block diagram of preview playback application, configured to perform various embodiments.

FIG. 7 is a block diagram of preview playback application 700, configured to perform various embodiments. As shown, preview playback application 700 interacts with interface engine 434 and is implemented as an element of playback application 436 (shown in FIG. 4). Alternatively, in some embodiments, preview playback application 700 is implemented as a client-side application that is separate from playback application 436 and runs in parallel with playback application 436 on endpoint device 115. Preview playback application 700 includes a playback state database 720, preview playback logic 730, and a UI message log 740.

Interface engine 434 is configured to instantiate or generate UI components of a GUI, such as canvases 510 of GUI 500, and to destroy such UI components. Further, interface engine 434 is configured to interact with preview playback application 700. More specifically, interface engine 434 is configured to read out data from playback state database 720, for example to modify one or more characteristics of playback by a UI component. In addition, interface engine 434 is configured to send messages to UI message log 740, for example in response to user inputs received by via a UI component.

Playback state database 720 stores values for playback state descriptors associated with the various display canvases included in a GUI generated by interface engine 434. Specifically, for each display canvas or associated media player that is included in the GUI, playback state database 720 stores a settable value for one or more playback state descriptors. Thus, for GUI 500 of FIGS. 5-6G, playback state database 720 stores playback state descriptor values for each display canvas 510 that currently is playing back or has played back at least a portion of a preview video. One embodiment of playback state database 720 is described below in conjunction with FIG. 8.

Figure 8:
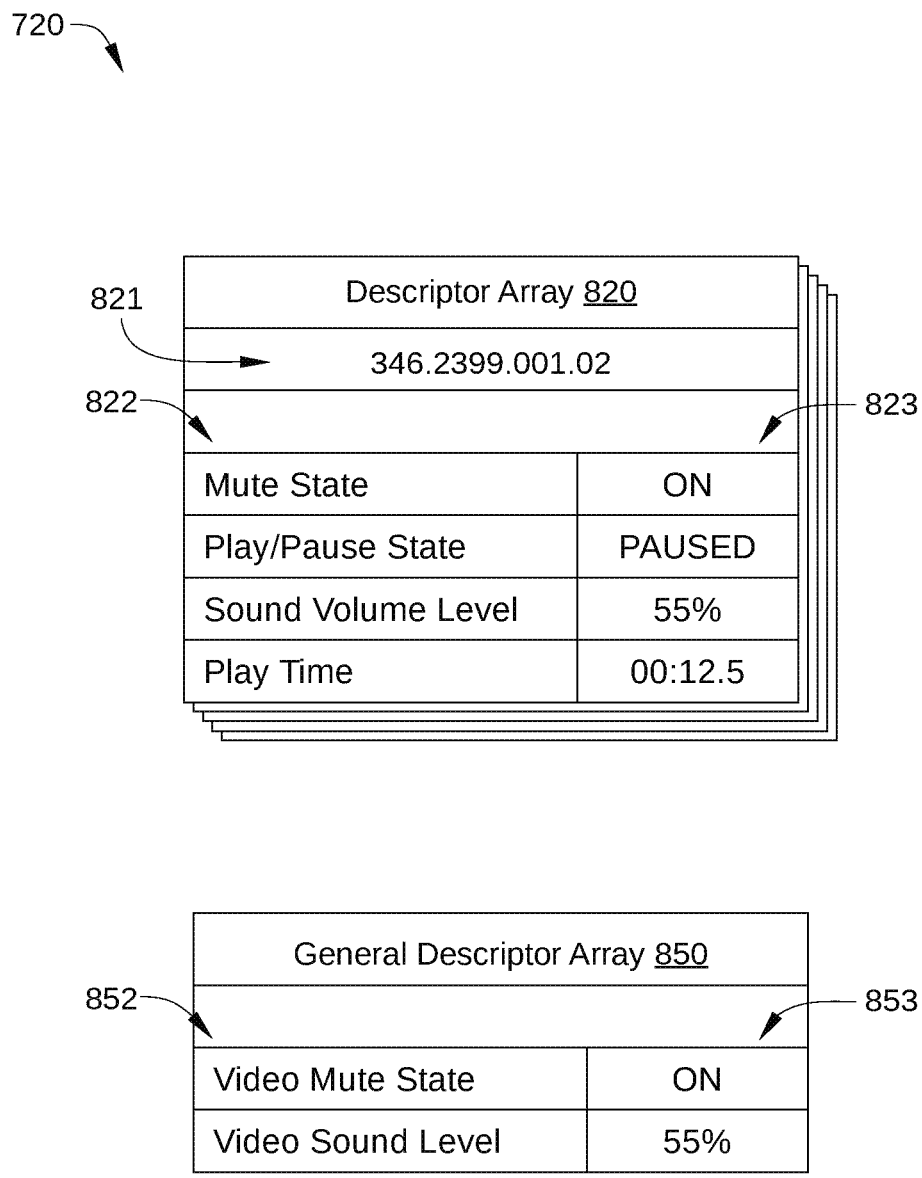
FIG. 8 is a schematic illustration of the playback state database of FIG. 7, according to an embodiment.

FIG. 8 is a schematic illustration of playback state database 720, according to an embodiment. Playback state database 720 includes a plurality of descriptor arrays 820, each associated with a different display canvas generated by interface engine 434. As shown, each descriptor array 820 includes a display canvas identification (ID) 821, a plurality of playback state descriptors 822, and a plurality of values 823 that are each associated with a respective playback state descriptor 822. In some embodiments, when playback of a preview video is started in a particular display canvas, a descriptor array 820 is generated for that particular display canvas, media player, or other UI component. In such embodiments, some descriptor arrays 820 can be associated with one type of UI component, such as a video preview canvas 613 in FIG. 6C, other descriptor arrays 820 can be associated with another type of UI component, such as a billboard canvas 511 in FIG. 5, and still other descriptor arrays 820 can be associated with yet another type of UI component, such as a feature-sized video preview canvas 614 in FIG. 6E.

Display canvas ID 821 includes a value that uniquely identifies a particular UI component that is included in a GUI generated by interface engine 434. In some embodiments, display canvas ID 821 includes one or more values indicating a specific type of UI component that is associated with descriptor array 820. In some embodiments, display canvas ID 821 includes one or more values indicating a specific video content item that is being played by the UI component or has most recently been played by the UI component. In some embodiments, display canvas ID 821 may include one or more values representing other information or attributes of the UI component and/or of the specific video content item that is being played by the UI component, such as location of the UI component in the GUI generated by interface engine 434, metadata associated with the specific video content item, etc.

Each playback state descriptor 822 in descriptor array 820 represents an attribute of the playback state of the UI component associated with that descriptor array 820. Thus, by changing a value 823 associated with a particular playback state descriptor 822 in a particular descriptor array 820, a characteristic of playing video content with the UI component associated with the particular descriptor array 820 changes. In the embodiment illustrated in FIG. 8, playback state descriptors 822 include mute state (e.g., ON or OFF), play/pause state (e.g., Playing, Paused, Ended), sound volume level (e.g., 55%), and play time (e.g., 12.5 seconds). Other playback state descriptors 822 for other attributes of the playback state of the UI component associated with that descriptor array 820 can also be included in descriptor array 820. In operation, playback of a first instance of a preview video is halted or paused in a first UI component while the first instance of the preview video is in a first playback state. Simultaneously, or at approximately the same time, playback of a second instance of the preview video in a second UI component can begin, where the second instance of the preview video begins in the first playback state. Consequently, playback of the preview video smoothly transitions from playback by the first UI component to playback by the second UI component.

In FIG. 8, for purposes of description, values 823 of playback state descriptors 822 are generally depicted as non-numeric values. In practice, values 823 stored for some or all playback state descriptors can be numeric values stored in a suitable data structure, where a specific meaning is attributed to different numeric values.

In some embodiments, playback state database 720 also includes a general descriptor array 850. In such embodiments, general descriptor array 850 includes one or more general playback state descriptors 852 and a plurality of values 853 that are each associated with a respective general playback state descriptor 822. In such embodiments, each general playback state descriptor 852 represents a general attribute of the playback state of any of the UI components currently included in the GUI. For example, in the embodiment illustrated in FIG. 8, general descriptor array 850 includes a video mute state and a video sound level. In embodiments in which playback state database 720 includes general descriptor array 850, the current values of general playback state descriptors 852 are employed by whatever UI component is currently performing playback of a preview video.

Returning to FIG. 7, preview playback logic 730 is configured to implement a seamless transition between the playback of a preview video in one media player (or other UI component) implemented in a GUI and another media player (or other UI component) implemented in the same GUI. Thus, in some embodiments, preview playback logic 730 receives messages, for example via UI message log 740, from UI components that receive user inputs. Preview playback logic 730 then updates playback state database 720 accordingly.

For example, in an embodiment, when a cursor is hovered over a particular display canvas included in a GUI, that particular display canvas sends a message to UI message log 740. In the embodiment, the message sent to UI message log 740 is an input indicating that a media player associated with or included in the particular display canvas is requested to play. In response to such an input, preview playback logic 730 sets the value 823 of an appropriate playback state descriptor 822, such as the playback state descriptor 822 that represents the play/pause state of that particular display canvas. The playback state descriptor 822 that is set is included in the descriptor array 820 for that particular display canvas.

In another example, in another embodiment, when a cursor is moved off of a particular display canvas included in a GUI, that particular display canvas sends a message to UI message log 740. In the embodiment, the message sent to UI message log 740 is an input indicating that a media player associated with or included in the display canvas is requested to stop playback of the preview video currently being played in that particular display canvas. In response, preview playback logic 730 sets all of the current values 823 included in the descriptor array 820 for that particular display canvas to reflect the current playback state of that particular display canvas. In this way, the playback state of that particular display canvas persists when the preview video that was being played in that particular display canvas begins to be played back in a later instance of a display canvas.

UI message log 740 receives and stores messages received from interface engine 434. In some embodiments, such messages originate from interface engine 434. Alternatively or additionally, in some embodiments, such messages originate from UI components included in a GUI generated by interface engine 434.

Implementation of Preview Playback Application

Figure 9:
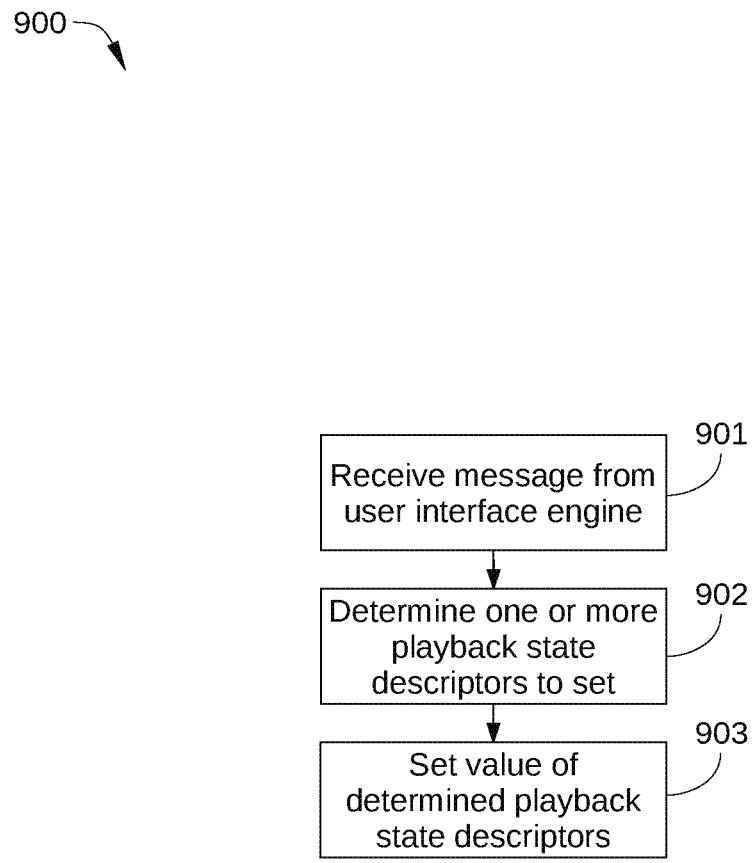
FIG. 9 sets forth a flowchart of method steps for updating a playback state database, according to various embodiments.

FIG. 9 sets forth a flowchart of method steps for updating a playback state database, according to various embodiments. Although the method steps are described with respect to the systems of FIGS. 1-8, persons skilled in the art will understand that any system configured to perform the method steps, in any order, falls within the scope of the present disclosure.

As shown, a method 900 begins at step 901, in which preview playback application 700 receives a message from interface engine 434. In some embodiments, preview playback application 700 receives the message by determining that UI message log 740 has been updated by interface engine 434.

In step 902, based on the message received in step 901, preview playback application 700 determines one or more playback state descriptors to be set. For example, when preview playback application 700 receives a message indicating that a value for a particular playback state descriptor 822 for a particular display canvas should be changed (e.g. mute state changed to ON), preview playback application 700 determines that the descriptor array 820 associated with that particular display canvas and that particular playback state descriptor 822 is to be set. In another example, when preview playback application 700 receives a message indicating that a media player associated with or included in a display canvas is requested to stop playback of the preview video currently being played in that particular display canvas, preview playback application 700 determines that all playback state descriptors 822 in the descriptor array 820 associated with the display canvas that has been requested to stop playback are to be set.

In some embodiments, in step 902 preview playback application 700 determines that one or more playback state descriptors 822 are to be changed in multiple descriptor arrays 820. For example, in one such embodiment, in step 901 preview playback application 700 receives a message indicating that a value 823 should be changed for a particular playback state descriptor 822 that applies to any instance of the video content currently being played (e.g., current play time). In the embodiment, preview playback application 700 determines that in each descriptor array 820 associated with the video content currently being played, the value 823 for the particular playback state descriptor 822 is to be set. Thus, when activated by a user, any display canvas that is associated with the video content currently being played can start at the current play time stored for that particular video content.

In some embodiments, in step 902 preview playback application 700 determines which descriptor arrays 820 included in playback state database 720 are associated with the video content currently being played. In such embodiments, preview playback application 700 makes the determination based on the display canvas ID 821 of each descriptor array 820. In alternative embodiments, in step 902 preview playback application 700 makes the determination via a lookup table or other data structure.

In step 903, preview playback application 700 sets the playback state descriptors 822 determined in step 902. For example, when preview playback application 700 has determined in step 902 that the descriptor array 820 associated with a particular display canvas and a particular playback state descriptor 822 is to be set, preview playback application 700 sets the value 823 of that particular playback state descriptor 822 to match an appropriate value (e.g. mute state set to ON). Similarly, when preview playback application 700 determines that all playback state descriptors 822 in a particular descriptor array 820 are to be set, preview playback application 700 sets the values 823 of all playback state descriptors 822 in that particular descriptor array 820 to match values indicating the current playback state of the display canvas associated with that particular descriptor array 820. For example, all playback state descriptors 822 in a particular descriptor array 820 may be set when the display canvas associated therewith has been requested to stop playback. Thus, the attributes of the display canvas that has been requested to stop playback are captured in an associated descriptor array 820 for subsequent application to another display canvas that is instantiated to display the same video content.

Figure 10:
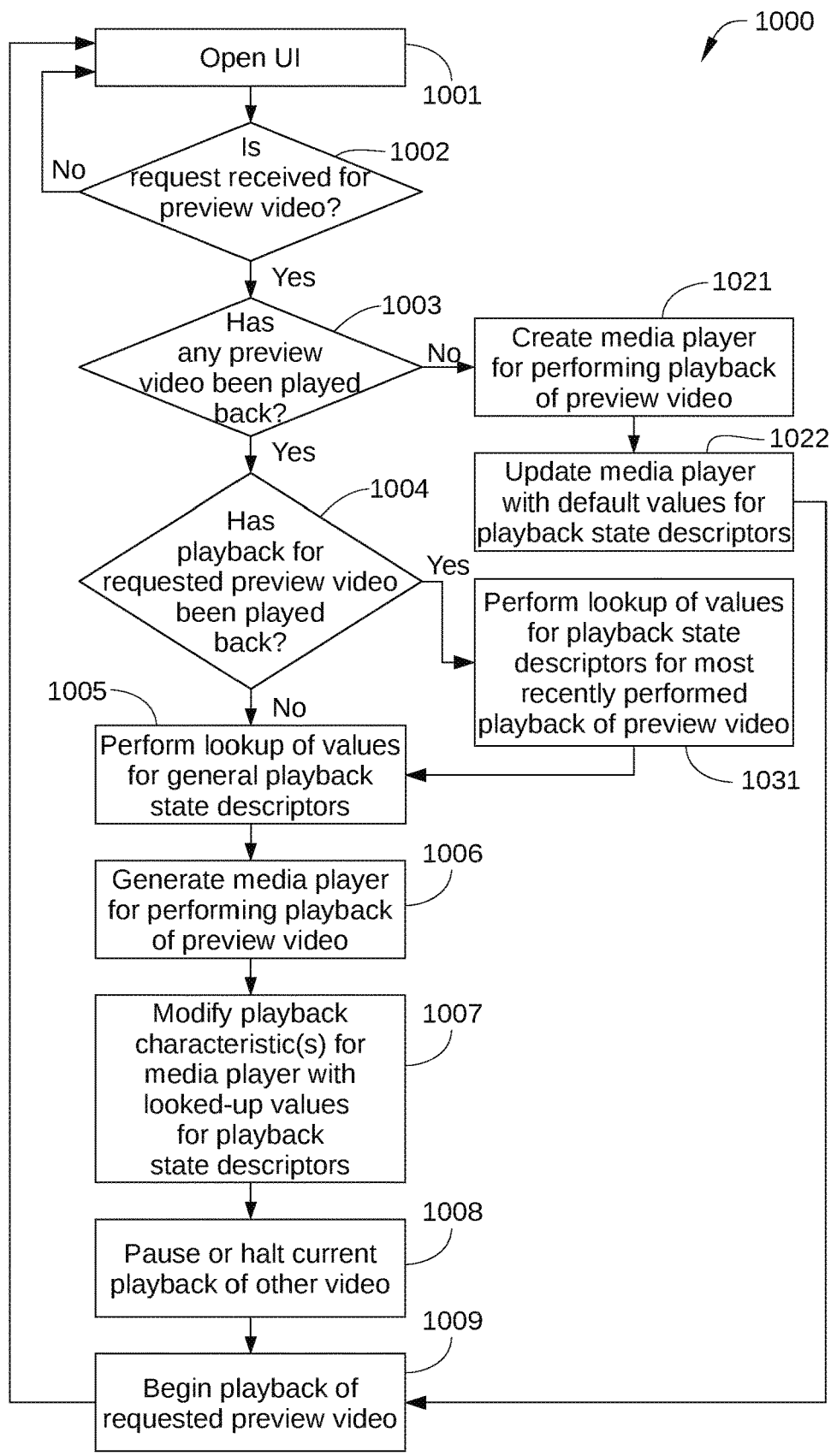
FIG. 10 sets forth a flowchart of method steps for transitioning playback of video content from a first user interface component to a second user interface component, according to various embodiments.

FIG. 10 sets forth a flowchart of method steps for transitioning playback of video content from a first UI component to a second UI component, according to various embodiments. Although the method steps are described with respect to the systems of FIGS. 1-9, persons skilled in the art will understand that any system configured to perform the method steps, in any order, falls within the scope of the present disclosure.

As shown, a method 1000 begins at step 1001, in which interface engine 434 generates or otherwise instantiates GUI 500. For example, in some embodiments, interface engine 434 opens GUI 500 in response to playback application 436 being executed on endpoint device 115.

In step 1002, interface engine 434 determines whether an input is received by a UI component of GUI 500 indicating that playback of a preview video for a particular video content item is requested. In some embodiments, such an input is received via an input operation, such as hovering a cursor over a particular display canvas of GUI 500, or selecting a more details icon 601 of GUI 500. If no, method 100 returns to step 1002; if yes, method 1000 proceeds to step 1003.

In step 1003, interface engine 434 determines whether playback of any other preview video has been performed by GUI 500. If no, method 1000 proceeds to step 1021; if yes, method 1000 proceeds to step 1004.

In step 1004, interface engine 434 determines whether playback of the preview video for the particular video content item indicated in step 1002 has been performed by a UI component of GUI 500. If yes, method 1000 proceeds to step 1031; if no, method 100 proceeds to step 1005.

In step 1005, interface engine 434 performs a lookup of values 853 for the general playback state descriptors 852 for GUI 500, if applicable. For example, in some embodiments, interface engine 434 performs a lookup of audio state descriptors (e.g., preview video mute state, preview video sound volume level, etc.).

In step 1006, if applicable, interface engine 434 generating a media player or other UI component for performing playback of the preview video for the particular video content item requested in step 1002. In some instances, the UI component for performing playback of the preview video already exists. For example, when a user hovers cursor 501 over a title card canvas 612 that has previously displayed at least a portion of the preview video, interface engine 434 does not create another media player or other UI component.

In step 1007, interface engine 434 modifies one or more characteristics of playback by the UI component based on values 853 for the general playback state descriptors 852 looked up in step 1005 and/or values 823 for the playback state descriptors 822 looked up in step 1031. For example, the mute state, sound volume level, and/or play time of the UI component are set to match values 823 and 853. As a result, the UI component generated or selected in step 1006 is configured to perform video playback in a specified playback state, such as a playback state of a display canvas that is most recently associated with the video content to be played by the UI component generated or selected in step 1006.

In step 1008, when applicable, interface engine 434 causes a UI component that is currently performing playback of other video content to pause or halt playback of the other video content. For example, prior to step 1008, such a UI component may be playing another preview video for a different video content item. Alternatively, in some embodiments, the UI component currently performing playback of the other video content sends a message to UI message log 740 indicating that the UI component is requested to be stopped. In such embodiments, preview playback logic 730 updates playback state database 720 as described above in conjunction with method 900 of FIG. 9. Further, in some embodiments, preview playback logic 730 causes downloading of video data associated with the other video content to stop or notifies playback application 436 to cause downloading of video data associated with the other video content to stop.

In step 1009, interface engine 434 begins playback of the preview video requested in step 1002. When applicable, one or more characteristics of playback by the UI component beginning playback of the preview video have been modified based on values 853 for general playback state descriptors 852 and/or values 823 for the playback state descriptors 822. Consequently, when the preview video requested in step 1002 has been performed previously by a UI component of GUI 500, playback of the preview video begins at the point the previous playback of the preview video ended. Further, in some embodiments, the audio state of the UI component beginning playback of the preview video matches that of the UI component that was previously performing playback in GUI 500. Once playback of the preview video begins, method 1000 returns to step 1002.

Step 1021 is performed in response to interface engine 434 determining that playback of no other preview video has been performed by GUI 500. For example, step 1021 is commonly performed shortly after GUI 500 is first opened. In step 1021, interface engine 434 creates a media player or other UI component for performing playback of the preview video for the particular video content item requested in step 1002. In step 1022, interface engine 434 modifies one or more characteristics of playback by the UI component created in step 1021 based on default values for values 853 for general playback state descriptors 852 and/or values 823 for the playback state descriptors 822. Method 1000 then proceeds to step 1008, where playback of the preview video requested in step 1002 begins.

Step 1031 is performed in response to interface engine 434 determining that playback of the preview video indicated in step 1002 has been performed previously by a UI component of GUI 500. In step 1031, interface engine 434 performs a lookup of one or more values 823 for the playback state descriptors 822 of the UI component that has most recently performed playback of the preview video indicated in step 1002. For example, in some embodiments, interface engine 434 performs a lookup of a value 823 for the play time of the UI component that has most recently performed playback of the preview video indicated in step 1002.

In sum, various embodiments set forth systems and techniques for transitioning playback of video content from a first UI component to a second UI component in a video streaming user interface. In the embodiments, current values of playback state descriptors for multiple UI components are stored in a client-side database. When transitioning playback of video content from the first UI component to the second UI component, a user interface engine determines a current value of a playback state descriptor of the first UI component from the database. The user interface engine then sets the corresponding playback state descriptor of the second UI component to match the current value of the playback state descriptor of the first UI component and begins playback of the video content with the second UI component using the current value of the playback state descriptor of the first UI component.

At least one technological improvement of the disclosed embodiments is that coordination of video playback is enabled between multiple UI components that can each perform video playback simultaneously. Consequently, downloading multiple video data streams when transitioning video playback from one UI component to another UI component can be avoided. In addition, multiple UI components are prevented from simultaneously performing playback of video content.

1. In some embodiments, a method comprises, based on an input to transition playback of a video content item from a first media player that is instantiated in a user interface to a second media player that is instantiated in the user interface, determining a current value of a first state descriptor associated with the first media player, setting a value of a second state descriptor associated with the second media player to match the current value of the first state descriptor, and, after setting the value of the second state descriptor, causing the second media player to begin playback of the video content item, where the second media player begins playing the video content item based on the value of the second state descriptor.

2. The method of clause 1, further comprising, after setting the value of the second state descriptor to match the current value of the first state descriptor, causing the first media player to stop playing the video content item.

3. The method of clause 1 or 2, wherein the first playback state descriptor is associated with a first attribute of a current playback state of the first media player and the second playback state descriptor is associated with a second attribute of a current playback state of the second media player.

4. The method of any of clauses 1-3, wherein the first attribute and the second attribute correspond to a same characteristic of playback of a video content item.

5. The method of any of clauses 1-4, wherein the first attribute of the first media player comprises one of a mute setting, a volume level, and a current play time associated with playback of the video content item on the first media player or the second attribute of the second media player comprises one of a mute setting, a volume level, and a current play time associated with playback of the video content item on the second media player.

6. The method of any of clauses 1-5, wherein the first attribute is included in a first array of attributes that are each associated with the current playback state of the first media player and the second attribute is included in a second array of attributes that are each associated with the current playback state of the second media player.

7. The method of any of clauses 1-6, wherein the input to transition playback of the video content item comprises a user input.

8. The method of any of clauses 1-7, wherein the user input is received via the user interface.

9. The method of any of clauses 1-8, wherein the input to transition playback of the video content item comprises a predetermined value for a third state descriptor associated with the second media player.

10. The method of any of clauses 1-9, further comprising, prior to determining the current value of the first state descriptor associated with the first media player, determining that a current value for the third state descriptor equals the predetermined value.

11. The method of any of clauses 1-10, wherein the first playback state descriptor is associated with an attribute of a current playback state of the video content item and the second playback state descriptor is associated with the attribute of the current playback state of the video of content item.

12. The method of any of clauses 1-11, further comprising instantiating the second media player concurrently with the first media player.

13. The method of any of clauses 1-12, further comprising causing at least a portion of the first media player and at least at least a portion of the second media player to be displayed concurrently by a same display device.

14. The method of any of clauses 1-13, further comprising generating the second media player based on the input to transition playback of the video content item from the first media player to the second media player.

15. In some embodiments, a non-transitory computer readable medium stores instructions that, when executed by a processor, cause the processor to perform the steps of: based on an input to transition playback of a video content item from a first media player that is instantiated in a user interface to a second media player that is instantiated in the user interface, determining a current value of a first state descriptor associated with the first media player, setting a value of a second state descriptor associated with the second media player to match the current value of the first state descriptor, and, after setting the value of the second state descriptor, causing the second media player to begin playback of the video content item, wherein the second media player begins playing the video content item based on the value of the second state descriptor.

16. The non-transitory computer readable medium of clause 15, further comprising, after setting the value of the second state descriptor to match the current value of the first state descriptor, causing the first media player to stop playing the video content item.

17. The non-transitory computer readable medium of clause 15 or 16, wherein the first playback state descriptor is associated with a first attribute of a current playback state of the first media player and the second playback state descriptor is associated with a second attribute of a current playback state of the second media player.

18. The non-transitory computer readable medium of any of clauses 15-17, wherein the first attribute and the second attribute correspond to a same characteristic of playback of a video content item.

19. In some embodiments, a system comprises a memory that stores instructions, and a processor that is coupled to the memory and is configured to perform the steps of, upon executing the instructions: based on an input to transition playback of a video content item from a first media player that is instantiated in a user interface to a second media player that is instantiated in the user interface, determining a current value of a first state descriptor associated with the first media player, setting a value of a second state descriptor associated with the second media player to match the current value of the first state descriptor, and after setting the value of the second state descriptor, causing the second media player to begin playback of the video content item, wherein the second media player begins playing the video content item based on the value of the second state descriptor.

20. The system of clause 19, wherein the first playback state descriptor is associated with a first attribute of a current playback state of the first media player and the second playback state descriptor is associated with a second attribute of a current playback state of the second media player.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
based on user input to transition between playback of first video content in a first media player included in a plurality of media players concurrently displayed in a user interface and playback of second video content in a second media player included in the plurality of media players, determining a current value of a first state descriptor associated with the first media player;
setting a value of a second state descriptor associated with the second media player to match the current value of the first state descriptor; and
after setting the value of the second state descriptor, causing the second media player to begin the playback of the second video content,
wherein the second media player begins the playback of the second video content based on the value of the second state descriptor.

2. The method of claim 1, further comprising, after setting the value of the second state descriptor to match the current value of the first state descriptor, causing the first media player to stop playing the first video content.

3. The method of claim 1, wherein the first playback state descriptor is associated with a first attribute of a current playback state of the first media player and the second playback state descriptor is associated with a second attribute of a current playback state of the second media player.

4. The method of claim 3, wherein the first attribute and the second attribute correspond to a same characteristic of playback of a video content item.

5. The method of claim 3, wherein the first attribute of the first media player comprises one of a mute setting, a volume level, and a current play time associated with playback of the first video content on the first media player or the second attribute of the second media player comprises one of a mute setting, a volume level, and a current play time associated with playback of the second video content on the second media player.

6. The method of claim 3, wherein the first attribute is included in a first array of attributes that are each associated with the current playback state of the first media player and the second attribute is included in a second array of attributes that are each associated with the current playback state of the second media player.

7. The method of claim 1, wherein the user input is received via the user interface.

8. The method of claim 1, wherein determining the current value of the first state descriptor associated with the first media player is further based on a predetermined value for a third state descriptor associated with the second media player.

9. The method of claim 8, further comprising, prior to determining the current value of the first state descriptor associated with the first media player, determining that a current value for the third state descriptor equals the predetermined value.

10. The method of claim 1, wherein the first playback state descriptor is associated with an attribute of a current playback state of the first video content and the second playback state descriptor is associated with the attribute of the current playback state of the second video content.

11. The method of claim 1, wherein the first state descriptor is associated with a volume level of the first media player and the second state descriptor is associated with a volume level of the second media player.

12. The method of claim 1, further comprising causing at least a portion of the first media player and at least at least a portion of the second media player to be displayed concurrently by a same display device.

13. A non-transitory computer readable medium storing instructions that, when executed by a processor, cause the processor to perform the steps of:
based on user input to transition between playback of first video content in a first media player included in a plurality of media players concurrently displayed in a user interface and playback of second video content in a second media player included in the plurality of media players determining a current value of a first state descriptor associated with the first media player;
setting a value of a second state descriptor associated with the second media player to match the current value of the first state descriptor; and
after setting the value of the second state descriptor, causing the second media player to begin the playback of the second video content,
wherein the second media player begins the playback of the second video content based on the value of the second state descriptor.

14. The non-transitory computer readable medium of claim 13, further comprising, after setting the value of the second state descriptor to match the current value of the first state descriptor, causing the first media player to stop playing the first video content.

15. The non-transitory computer readable medium of claim 13, wherein the first playback state descriptor is associated with a first attribute of a current playback state of the first media player and the second playback state descriptor is associated with a second attribute of a current playback state of the second media player.

16. The non-transitory computer readable medium of claim 15, wherein the first attribute and the second attribute correspond to a same characteristic of playback of a video content item.

17. The non-transitory computer readable medium of claim 13, wherein the first state descriptor is associated with a volume level of the first media player and the second state descriptor is associated with a volume level of the second media player.

18. A system, comprising:
a memory that stores instructions; and
a processor that is coupled to the memory and is configured to perform the steps of, upon executing the instructions:
based on user input to transition between playback of first video content in a first media player included in a plurality of media player concurrently displayed in a user interface and playback of second video content in a second media player included in the plurality of media players, determining a current value of a first state descriptor associated with the first media player;
setting a value of a second state descriptor associated with the second media player to match the current value of the first state descriptor; and
after setting the value of the second state descriptor, causing the second media player to begin the playback of the second video content,
wherein the second media player begins the playback of the second video content based on the value of the second state descriptor.

19. The system of claim 18, wherein the first playback state descriptor is associated with a first attribute of a current playback state of the first media player and the second playback state descriptor is associated with a second attribute of a current playback state of the second media player.

* * * * *